Dec. 29, 1931. W. W. WILSON 1,838,344
LUGGAGE CARRIER FOR AUTOMOBILE BODIES
Filed Aug. 19, 1929
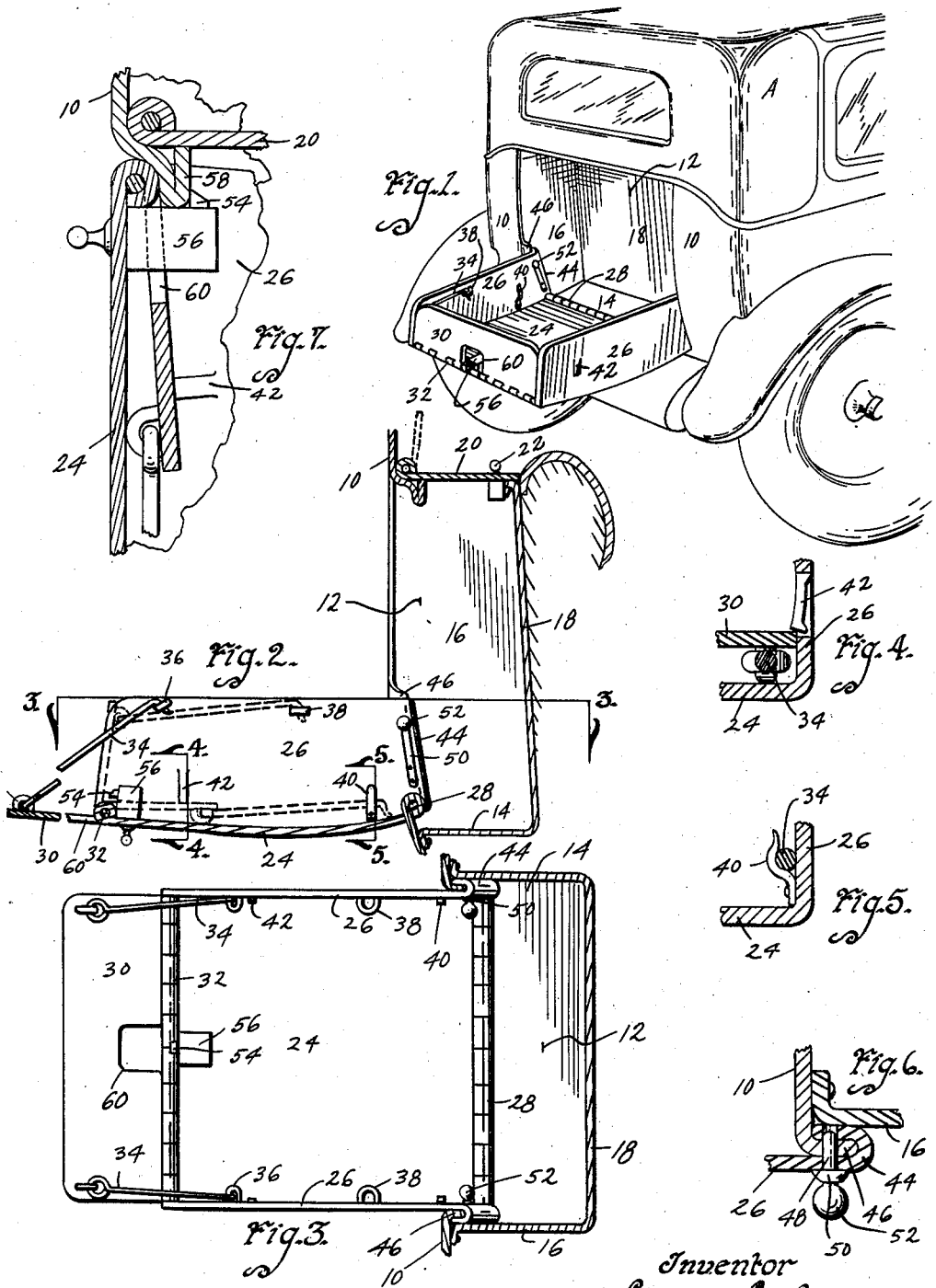
Witness
Edw. Seeley
Inventor
William W. Wilson
by Bair, Freeman & Sinclair
Attorneys Patented Dec. 29, 1931

1,838,344

UNITED STATES PATENT OFFICE

WILLIAM W. WILSON, OF SIOUX CITY, IOWA, ASSIGNOR TO KARI-KEEN MANUFACTURING COMPANY, INC., A CORPORATION OF DELAWARE

LUGGAGE CARRIER FOR AUTOMOBILE BODIES

Application filed August 19, 1929. Serial No. 386,916.

The object of my invention is to provide a luggage carrier adapted to be built into an automobile body, the device being simple and durable and comparatively inexpensive to manufacture.

More particularly, it is my object to provide in the rear wall of an automobile body a recess adapted for the storage of articles and having a closure member forming a portion of the rear wall of the automobile, such closure member being hingedly connected to the automobile body so that it can be swung outwardly to form an extension of the body to serve as a luggage carrier in conjunction with the recess in the automobile body.

A further object is to provide a fixed recess in the rear wall of an automobile body of box like construction and to provide a movable box like device adapted to be telescopically received in the fixed box like device so that the bottom of the movable box like device forms a portion of the rear wall of the automobile and is thus folded to an inconspicuous position.

Still a further object is to provide a lid for the fixed box like device, such lid being mounted on the inside of the automobile body and capable of being moved to a raised position whereby access may be had to the interior of the box like luggage carrier when in closed position.

Another object is to provide a hinged back on the movable box like device so that such back can be moved to a position where it will not interfere with entrance into the device when in folded position through the lid on the interior of the automobile.

Another object is to provide details of construction whereby the parts are foldably associated with each other and lock devices for holding the parts in their various desired positions.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of an automobile body showing my luggage carrier therefor in extended or luggage carrying position.

Figure 2 is a central vertical sectional view of the luggage carrier and the portion of the automobile body having the fixed box like recess therein.

Figure 3 is a sectional view on the line 3—3 of Figure 2 showing the movable box like luggage carrier in plan view.

Figures 4, 5 and 6 are enlarged sectional views on the lines 4—4, 5—5 and 6—6 respectively of Figure 2; and Figure 7 is an enlarged sectional view of the upper left hand portion of Figure 2 showing coacting portions of the device when in folded position.

On the accompanying drawings I have used the reference character A to indicate generally an automobile. The rear wall 10 of the automobile A is provided with a fixed box like recess 12 formed of a plurality of walls. The bottom wall of the recess 12 is designated as 14, the side walls as 16 and the front wall as 18. The top of the recess 12 is formed by a lid 20 which is preferably hinged and provided with a latch 22.

For association with the fixed box like recess 12 I provide a movable box like member B adapted to serve as a luggage carrier. The movable member B consists of a bottom 24 and side walls 26. The bottom 24 is hinged as indicated at 28 to the automobile body. The sides 26 are stationary relative to the bottom 24.

A back wall 30 is hinged to the bottom 24 by means of a hinged connection 32. The back wall 30 is capable of assuming a substantially horizontal full line position as shown in Figure 2, a vertical position as shown in dotted lines, or another horizontal position as also shown in dotted lines in this figure.

A hook 34 is provided adjacent each end of the back wall 30 and is adapted to selectively coact with eyes 36 or 38 when the back wall 30 is in the first two positions described in the last paragraph. When in the third position the hooks 34 are adapted to be received in clips 40 and the back wall 30 may be retained in position against the bottom 24 by spring latches 42.

When the movable box like member B is extended to full line positions shown in Figures 1, 2 and 3, a hooked flange 44 on the forward end of each side wall engages an oppositely directed flange 46 formed on the back wall 10 of the automobile A as best shown in Figure 6 of the drawings. To prevent accidental bouncing and consequent partial folding of the movable member B when driving over rough roads, I provide a latch 48 for each flange 46. The latch pins 48 are mounted on leaf spring supporting devices 50 and are provided with knobs 52 for convenience in manipulating them.

As shown in Figure 2 the movable box like member B may be extended to a luggage carrying position where bulky articles can be piled into the member B and may also extend into the recess 12. Where such articles are longer than the distance from the bottom of the recess 12 to the back wall 30, the back wall 30 may be caused to assume the position shown in Figures 2 and 3 instead of the position shown in Figure 1. The hooks 34 support the back wall 30 against dropping downwardly to a hanging position. The hinged lid 20 may be raised for gaining access to any small luggage which might be carried in the recess 12 whether the movable member B is open or closed.

When it is desired to close the movable member B as for instance when there is no bulky luggage to carry, the back wall 30 is first moved to the horizontal dotted position shown in Figure 2 and retained in such position by the spring latches 42. The clips 40 serve to hold the hooks 34 to prevent them from rattling when the automobile is in motion. The knobs 52 are now engaged and pulled toward each other for allowing the movable member B to be swung upwardly so that the sides 26 telescope into the recess 12 and the bottom 24 serves as a cover for the recess as shown in Figure 7. In such a position a latch 54 of a lock 56 coacts with a flange 58 for holding the luggage carrier in closed position. The lock 56 may be of ordinary spring actuated type or may be provided with a tumbler lock to be opened by a key. The back wall 30 is provided with a notch 60 to allow the lock 56 to extend through when the back is folded against the bottom 24.

The back 30 is adapted to fold against the bottom 24 as shown in Figure 7 so as not to prevent access to the space in the recess 12 and in front of the bottom 24 which serves as a portion of the back wall 10 when the device is in closed position. Thus the lid 20 may be opened so that articles can be placed in the recess 12 or removed therefrom when the member B is in closed position.

The entire device is very simple and does not take up prohibitive room but may be easily built into the back of the automobile in front of the back seat. The interior of the recess is readily accessible through the lid 20 and the luggage carrier is very inconspicuous as from the outside the appearance of the automobile is but little altered. The side edges of the bottom wall 24 may be provided with molding members if desired to cover the cracks between the walls 26 and the walls 16 when the device is folded.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with an automobile body having a fixed box-like recess therein, provided with an openable top, a luggage carrier comprising a movable box-like carrier telescopically associated with said box-like recess, said fixed box-like device and carrier when associated in one position serving as an enclosure entirely mounted within the outline of the automobile body and accessible through said openable top and when in another associated position the carrier projects beyond the outline of the automobile body, the rear wall of said movable box-like carrier being hinged to provide for accessibility to the carrier when the openable top is open and when the carrier is in the first mentioned position.

2. In combination with an automobile body having a vertical fixed box-like recess therein provided with an openable top adjacent the top of the back seat of the automobile body, a luggage carrier of box-like construction pivoted to the automobile body and adapted to assume a vertical position within said recess when in closed position and a horizontal position projecting from said automobile body when in open position, the back wall of said box-like luggage carrier being hinged to assume a vertical position when the luggage carrier is in closed position to admit access to the interior thereof through said openable top without interference from said back wall.

WILLIAM W. WILSON.